(12) United States Patent
Li et al.

(10) Patent No.: US 11,809,976 B1
(45) Date of Patent: Nov. 7, 2023

(54) MACHINE LEARNING MODEL WITH LAYER LEVEL UNCERTAINTY METRICS

(71) Applicant: Intuit Inc., Mountain View, CA (US)

(72) Inventors: Shuyi Li, Mesa, AZ (US); Kamalika Das, Saratoga, CA (US); Apoorva Banubakode, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/102,247

(22) Filed: Jan. 27, 2023

(51) Int. Cl.
*G06N 20/00* (2019.01)
(52) U.S. Cl.
CPC .................................. *G06N 20/00* (2019.01)
(58) Field of Classification Search
CPC ........ G06N 20/00; G06N 20/10; G06N 20/20; G06N 5/00; G06N 5/01
See application file for complete search history.

(56) References Cited

U.S. PATENT DOCUMENTS

| | | | | |
|---|---|---|---|---|
| 2020/0086862 | A1* | 3/2020 | Cui ...................... | G05D 1/0221 |
| 2020/0175415 | A1* | 6/2020 | Zou ........................ | G06N 20/00 |
| 2021/0057108 | A1* | 2/2021 | Fisher .................... | G06N 3/045 |
| 2021/0201112 | A1* | 7/2021 | Gauthier Melançon ..................... | G06V 10/40 |
| 2022/0405615 | A1* | 12/2022 | Prokhorenkova ...... | G06N 20/20 |

OTHER PUBLICATIONS

Blundell et al., "Weight Uncertainty in Neural Network." In Francis Bach and David Blei, editors, Proceedings of the 32nd International Conference on Machine Learning, vol. 37 of Proceedings of Machine Learning Research, pp. 1613-1622, Lille, France, Jul. 7-9, 2015. PMLR.

Depeweg et al., "Decomposition of Uncertainty in Bayesian Deep Learning for Efficient and Risk-Sensitive Learning," 10-pages, 2017.

"Gal et al., "Dropout as a Bayesian Approximation: RepresentingModel Uncertainty in Deep Learning." In Maria Florina Balcan and Kilian Q. Weinberger, editors, Proceedings of The 33rd International Conference on Machine Learning, vol. 48 of Proceedings of Machine Learning Research, pp. 1050-1059, New York, New York, USA,Jun. 20-22, 2016. PMLR.".

(Continued)

*Primary Examiner* — Shane D Woolwine
(74) *Attorney, Agent, or Firm* — Paradice & Li LLP

(57) ABSTRACT

Systems and methods are disclosed for classifying objects by a machine learning (ML) model. The ML model includes one or more layer level classification models to generate classifications and uncertainty metrics in the classifications and a meta-model to generate a final classification and confidence based on the underlying classifications and uncertainty metrics. In some implementations, the ML model provides an object to be classified to one or more layer level classification models, and the layer level classification models generate a classification for the object and an uncertainty metric in the classification. The meta-model receives the classifications and uncertainty metrics from the one or more layer level classification models and generates the final classification and confidence in the final classification. The uncertainty metrics may also be output by the ML model or used to adjust the meta-model to improve the final classification and confidence.

20 Claims, 4 Drawing Sheets

(56) References Cited

OTHER PUBLICATIONS

Lan et al., "Scaling up Bayesian Uncertainty Quantification for Inverse Problems using Deep Neural Networks." pp. 1-38, 2021.
Mackay, "A Practical Bayesian Framework for Backpropagation Networks." NeuralComput., 4(3):448-472, 1992.
Malinin et al., "Uncertainty in Gradient Boosting via Ensembles." Published as a conference paper at ICLR 2021, 17-pages.
Mobiny et al., "Dropconnect is Effective in Modeling Uncertainty of Bayesian Deep Networks," Scentific Reports, Nature Porfolio, 14-pages, 2019.
Neal, "Bayesian Learning for Neural Networks." Springer-Verlag, Berlin, Heidelberg, 1996, 195-pages.
Shaker et al., "Aleatoric and Epistemic Uncertainty with Random Forests." In Michael R. Berthold, Ad Feelders, and Georg Krempl, editors, Advances in Intelligent Data Analysis XVIII, pp. 444-456, Cham, 2020. Springer International Publishing.
Ustimenko et al., "SGLB: Stochastic Gradient Langevin Boosting." In Marina Meila and Tong Zhang, editors, Proceedings of the 38th International Conference on Machine Learning, vol. 139 of Proceedings of Machine Learning Research, pp. 10487-10496. PMLR, Jul. 18-24, 2021.

\* cited by examiner

MACHINE LEARNING MODEL WITH LAYER LEVEL UNCERTAINTY METRICS

TECHNICAL FIELD

This disclosure relates generally to the implementation and use of machine learning models including layer level uncertainty metrics for classification problems, including the implementation and use of a uncertainty metrics at the layer level for a cascaded binary classification system.

DESCRIPTION OF RELATED ART

Various machine learning (ML) models are used to perform classifications for any variety of objects input to the ML model. For example, a variety classification models may be trained to classify images, documents, e-mails, people profiles, or any other input data into one or more categories. Such classifications by an ML model may be associated with a confidence in the classification, and there is ongoing work to improve classifications and confidences generated by classification models.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for classifying objects by a machine learning (ML) model. The method includes obtaining an object to be classified by the ML model and providing the object to one or more layer level classification models of a layer of the ML model. The method also includes, for each of the one or more layer level classification models of the layer, generating a classification for the object and an uncertainty metric corresponding to the classification by the layer level classification model. The method further includes, for each of the one or more layer level classification models of the layer, providing the classification and the uncertainty metric to a meta-model of the ML model. The method also includes generating, by the meta-model, a final classification of the object and a confidence in the final classification based on the one or more classifications and the one or more uncertainty metrics corresponding to the one or more classifications.

Another innovative aspect of the subject matter described in this disclosure can be implemented in a system for classifying objects by an ML model. An example system includes one or more processors and a memory storing instructions that, when executed by the one or more processors, cause the system to perform operations. The operations include obtaining an object to be classified by the ML model and providing the object to one or more layer level classification models of a layer of the ML model. The operations also include, for each of the one or more layer level classification models of the layer, generating a classification for the object and an uncertainty metric corresponding to the classification by the layer level classification model. The operations further include, for each of the one or more layer level classification models of the layer, providing the classification and the uncertainty metric to a meta-model of the ML model. The operations also include generating, by the meta-model, a final classification of the object and a confidence in the final classification based on the one or more classifications and the one or more uncertainty metrics corresponding to the one or more classifications.

In some implementations, a system performing the above method or operations also performs providing one or more features of the object to the meta-model. The one or more features are defined as being highly correlated to the final classification, with generating the final classification of the object and the confidence in the final classification by the meta-model being further based on the one or more features of the object.

In configuring layer level classification models to generate uncertainty metrics, the confidence in the final classification may be quantified in order to improve the model and thus make an ML model more reliable. In addition, specific classifications provided by the classifications models may be identified as being reliable or unreliable based on the uncertainty metrics. If the layer level uncertainty metrics are provided to a user, different layer level classification models' contributions to a confidence in a final classification by the overall ML model may be understood. In some implementations, the meta-model may adjust the generation of a final classification based on such layer level uncertainty metrics by removing a classification associated with a high uncertainty from consideration in generating the final classification, thus improving the performance of the ML model. For example, the meta-model may disregard a layer level classification model's output if the uncertainty metric is greater than a threshold or based on a user indicating to disregard such if the uncertainty metrics are provided to a user for review.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
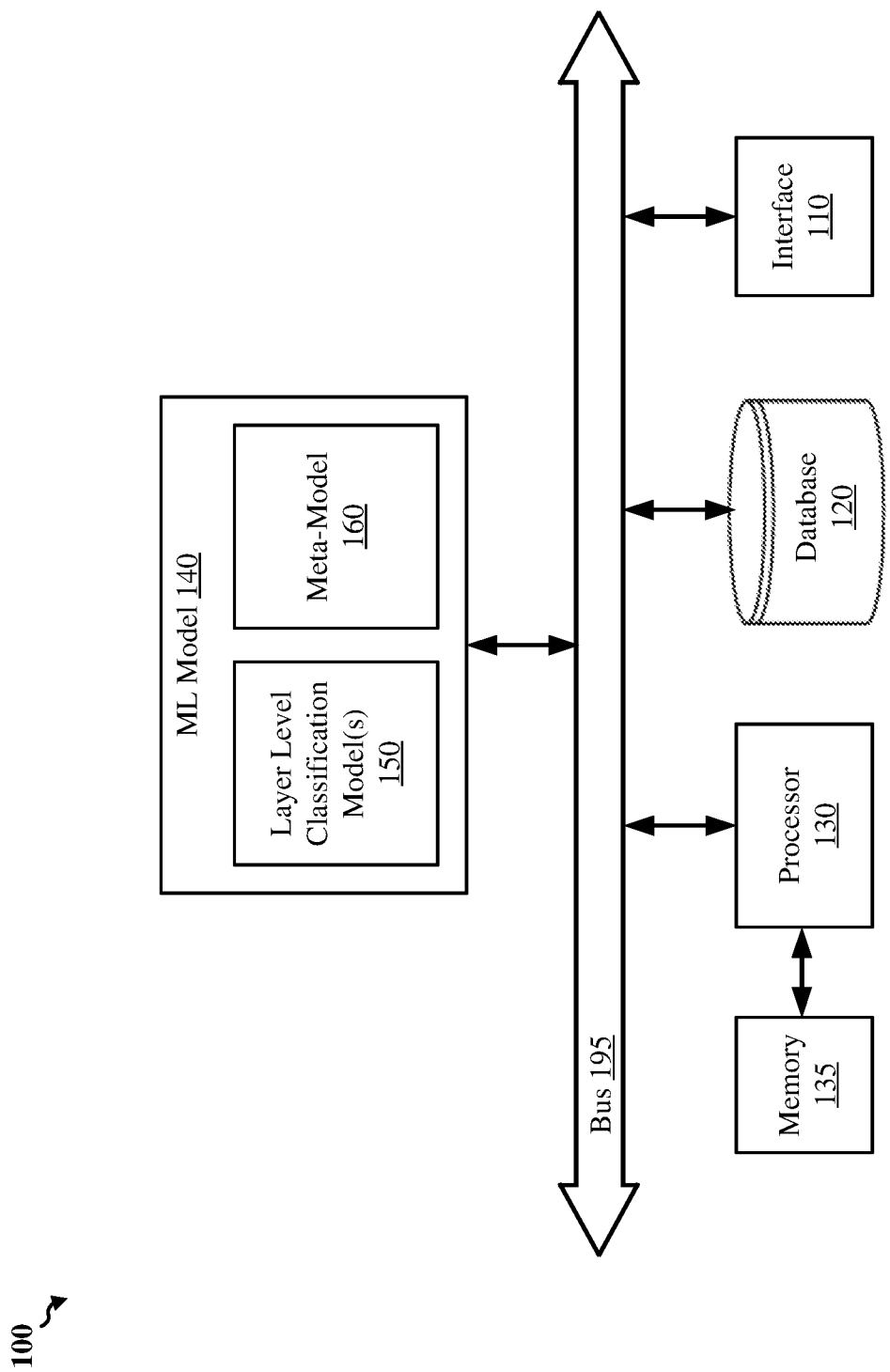
FIG. 1 shows an example system for classifying objects by a machine learning (ML) model, according to some implementations.

Implementations of the subject matter described in this disclosure may be used for the implementation and use of machine learning (ML) models including layer level uncertainty metrics for classification problems. In particular, a cascaded binary classification system may be configured to generate uncertainty metrics at one or more layers of the system, with the uncertainty metrics being used to generate the final classification and confidence by the cascaded binary classification system.

As used herein, an "object" refers to any suitable object for various matching problems, such as images, documents, datasets, and so on. Various ML models may be used to automate classification and improve the accuracy of automated classification as compared to a rule based system. For example, a binary classification model (or other multiclass classification models), such as naïve Bayes, decision trees, random forests, etc., may be configured to generate a classification for an object input to the classification model.

Some ML models may be configured to aggregate a plurality of classification models to generate a final classification. For example, an ML model may include one or more classification models at an input layer and/or one or more hidden layers of the ML model, and each classification model may generate a classification for an object input to the ML model. The ML model may thus include a meta-model to combine the classifications of the layer preceding the meta-model to generate a final classification of the object. Such an ML model may be trained to generate final classifications of objects and confidences in the final classifications. The confidence indicates the accuracy of the classification to indicate to a user (or another system that may use the classification) as to whether the classification is accurate and thus can be trusted. For example, confidences may be on a scale from 0 to 1, and a confidence of 0.5 may indicate that a final classification is just as likely to be incorrect as to be correct.

While a confidence provides an indication as to whether a final classification is accurate, ML models do not provide insights into the reasons behind the specific confidence generated. For example, if an ML model includes a plurality of classification models combined through the use of a meta-model, one or more of the classification models may be inaccurate in its classifications, and such inaccuracies may decrease a confidence in the final classification generated by the ML model. For an ML model including one or more inaccurate classification models for a specific object, while a user may know from the confidence for the final classification of the object that the final classification may be inaccurate or less accurate than desired, the user is not aware that such an inaccuracy may be caused by the hidden classification models that are inaccurate. In addition, such inaccuracies from one or more classification models may not be expressed within the ML model such that the final confidence generated by the ML model may not be as accurate as desired.

As such, there is a need to implement an ML model that is able to express uncertainties in classifications generated by layer level classification models in order to generate insights into the accuracy of different components of the ML model as well as improve the confidence generated in the final classification. As used herein, a layer may refer to an input layer or a hidden layer of the ML model, and the layer may include one or more layer level classification models.

Various implementations of the subject matter disclosed herein provide one or more technical solutions to improving ML models for classification. In some implementations, a computing system is configured to obtain an object to be classified by an ML model of the computing system and provide the object to one or more layer level classification models of a layer of the ML model. For each of the one or more layer level classification models of the layer, the layer level classification model generates a classification for the object and an uncertainty metric corresponding to the classification by the layer level classification model. The layer level classification model also provides the classification and the uncertainty metric to a meta-model of the ML model. The meta-model generates a final classification of the object and a confidence in the final classification based on the one or more classifications and the one or more uncertainty metrics corresponding to the one or more classifications. In some implementations, the uncertainty metrics are output by the ML model (such as to a user) to provide insight into the confidence in the final classification, or the uncertainty metrics may be used to adjust the meta-model to improve the final classification and confidence.

Various aspects of the present disclosure provide a unique computing solution to a unique computing problem that did not exist prior to the creation of machine learning models. Use of machine learning technology as described herein cannot be performed in the human mind, much less using pen and paper. As such, implementations of the subject matter disclosed herein are not an abstract idea such as organizing human activity or a mental process that can be performed in the human mind.

FIG. 1 shows an example system 100 for classifying objects by an ML model 140, according to some implementations. The system 100 includes an interface 110, a database 120, a processor 130, a memory 135 coupled to the processor 130, and the ML model 140. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to obtain objects for classification (such as documents, images, datasets, or any other suitable objects), provide final classification of the objects and confidences in the final classifications, provide information to one or more users and obtain user inputs (such as via a web portal for a remote system or user interface devices for a local system), or receive or provide inputs or outputs for continued operation of the system 100. An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from other devices (such as a user's local computing system if system 100 is remote to a user). If the system 100 is local to a user, the interface 110 may include a display, a speaker, a mouse, a keyboard, or other suitable input or output elements that allow interfacing with the user.

The database 120 may store objects for classification obtained by the interface 110. The database 120 may also store final classifications or confidences generated by the ML model 140, uncertainty metrics output by the ML model, or other computer executable instructions or data for operation of the system 100. In some implementations, the database 120 may include a relational database capable of presenting information (such as indications of the obtained objects and the generated classifications and confidences) as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications or the ML model 140. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications or the ML model 140 that may be executed by the processor 130. The memory 135 may also store objects, final classifications, confidences, uncertainty metrics, other outputs by the ML model 140, or any other data for operation of the ML model 140. In some implementations, hardwired circuitry may be used in place of, or in combination with, software instructions to implement aspects of the disclosure. As such, implementations of the subject matter disclosed herein are not limited to any specific combination of hardware circuitry and/or software.

Figure 2:
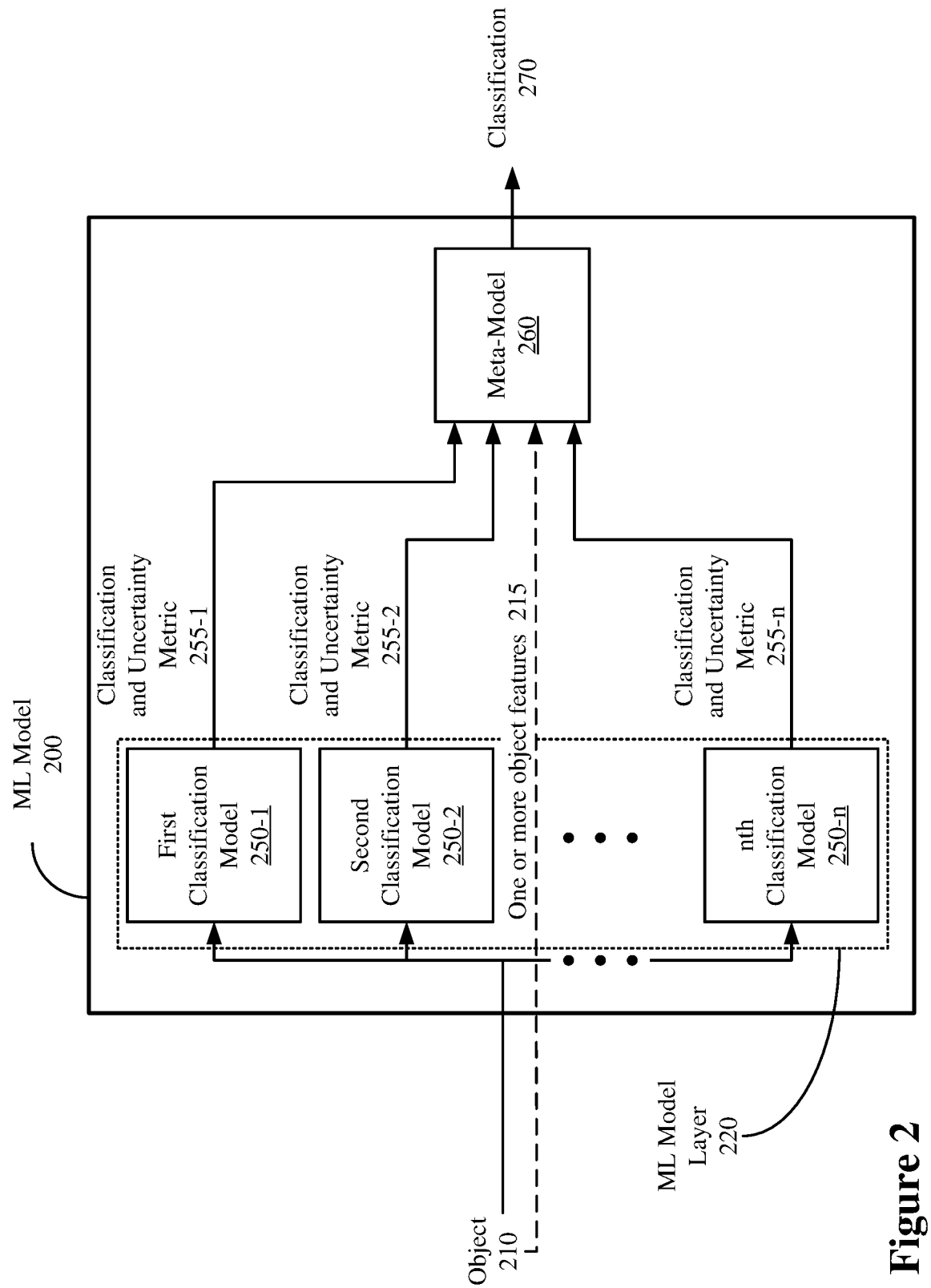
FIG. 2 shows an example ML model for classifying objects, according to some implementations.
Figure 3:
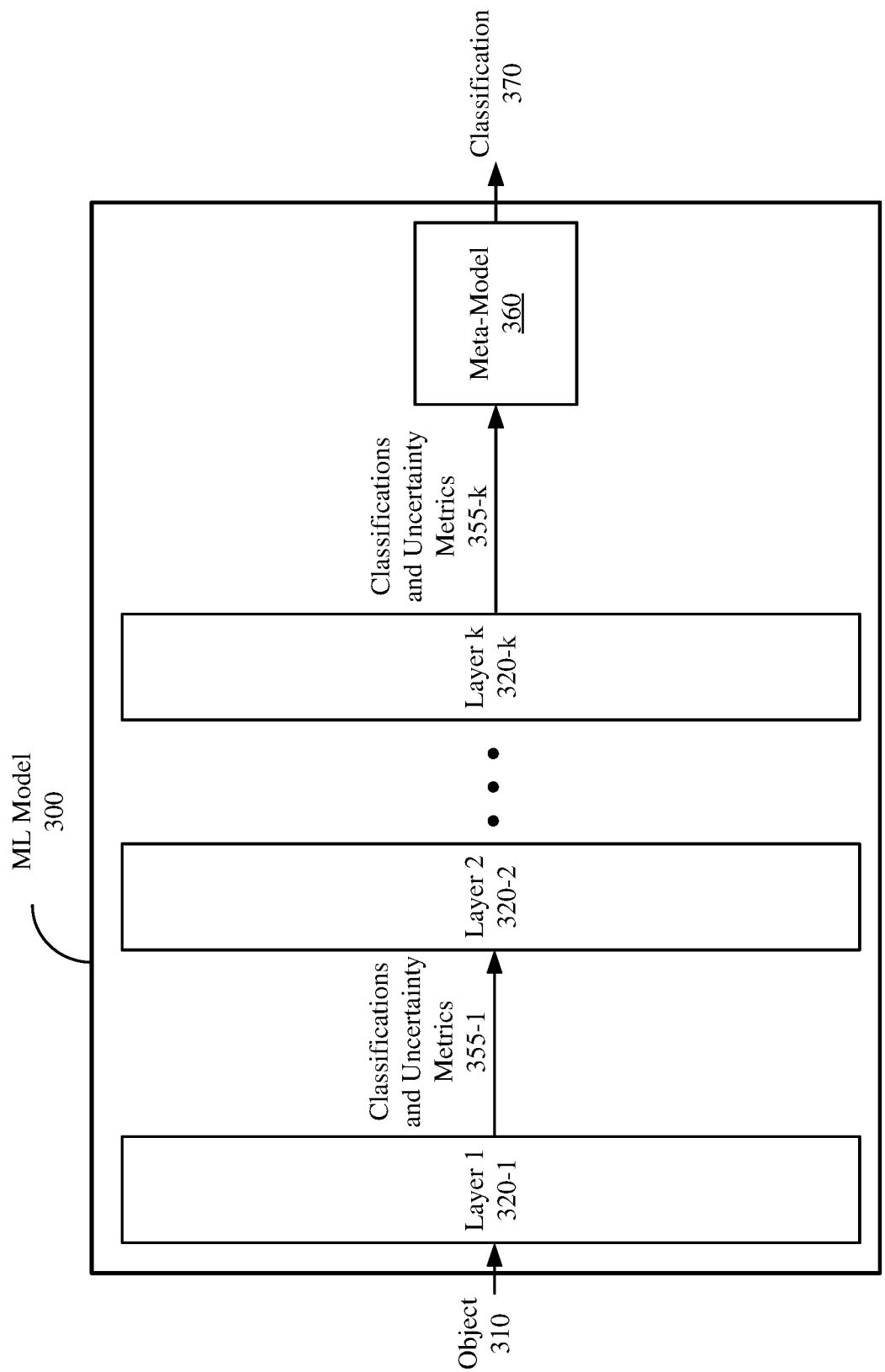
FIG. 3 shows an example multiple layer ML model for classifying objects, according to some implementations.

The ML model 140 generates a final classification of an object and a confidence in the final classification. In some implementations, the classification is a binary classification, but the ML model 140 may be configured to generate classifications for any number of classes. The ML model 140 includes one or more layer level classification models 150 and a meta-model 160. One or more layer level classification models 150 are configured to generate a classification for an object and an uncertainty metric in the classification. In some implementations, a classification by a classification model 150 may be of whether one or more features of an object are relevant or correlate to classifying the object by the meta-model 160. The uncertainty metric in the classification may be similar to a confidence, such as a value between 0 and 1 indicating an accuracy of the classification by the layer level classification model 150. The meta-model 160 is configured to receive one or more classifications and uncertainty metrics and generate a final classification and confidence based on the one or more classifications and uncertainty metrics. Example configurations and examples of the layer level classification models 150 and the meta-model 160 are depicted in FIGS. 2 and 3, which are described in more detail below.

The one or more layer level classification models 150 may be any suitable classification models, such as being based on one or more of decision trees, gradient boosted trees, random forests, or other classification trees. In some implementations, one or more layer level classification models 150 are binary classification models that are also configured to generate uncertainty metrics. In a specific example, a layer level classification model may be a gradient boosted decision tree (GBDT) model that uses stochastic gradient Langevin dynamics (SGLD) with gradient boosting to generate the binary classification and the uncertainty metric corresponding to the binary classification. For example, the ML model may be programmed in the Python programming language, and the XGBoost software library may be used to generate a classification model configured to generate a classification and an uncertainty metric. While an example binary classification model is provided, any suitable binary (or other multiple class) classification model may be used, such as a random forest, neural network, or Bayesian logistic regression (BLR) model.

The meta-model 160 is any suitable model configured to generate the final classification and confidence in the final classification based on the classifications and uncertainty metrics from the one or more layer level classification models 150. In some implementations, the meta-model 160 is a BLR model trained to generate a posterior probability distribution based on the one or more classifications of the object by the layer level classification models 150 and the one or more uncertainty corresponding to the one or more classifications. The final classification of the object and the confidence in the final classification are thus based on the posterior probability distribution. In some implementations, the final classification of the object is based on the mean of the maximum posterior solution, and the confidence in the final classification is based on the variance of the maximum posterior solution.

The meta-model 160 may also receive one or more object features that have a high correlation to the final classification. For example, through manual observation, a user or developer may identify object features that are highly correlated to classifying the object. In a simplified example, if the ML model is to be configured to classify images as to whether or not an image includes a streetlight, a user may observe that an image with specific red, green, or yellow colors, specific pixels' values in the image, a specific location of the image indicated in the metadata, and so on may be indicative as to whether or not the image includes a streetlight. In some implementations, the system 100 (such as the ML model 140) may include a pre-processing module configured to obtain, from an object, the one or more features defined (such as by a user or developer) to be highly correlated to the final classification. The obtained features may thus be provided to the meta-model 160, which may also use the features in generating the posterior probability distribution.

While the ML model 140 (which may include the layer level classification models 150 and the meta-model 160) is depicted as a separate component of the system 100 in FIG. 1, the ML model 140 may be included in software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. In addition, in other implementations, components of the system 100 may be distributed across multiple devices, may be included in fewer components, and so on. While the examples herein are described with reference to system 100, any suitable system may be used to perform the operations described herein. If the ML model 140 is implemented in software, the ML model 140 may be implemented using any suitable computer-readable language. For example, each of the classification models 150 and the meta-model 160 and the configuration and interoperability of such models may be programmed in the Python programming language using any suitable libraries.

FIG. 2 shows an example ML model 200 for classifying objects, according to some implementations. The ML model 200 is an example implementation of the ML model 140 in FIG. 1. As such, the classification models 250 may be an example implementation of the one or more layer level classification models 150 in FIG. 1, and the meta-model 260 may be an example implementation of the meta-model 160 in FIG. 1. As depicted, the ML model 200 receives object 210 and generates classification 270 for the object 210. The ML model 200 includes n number of classification models 250 (for integer n greater than or equal to one) in an ML model layer 220 preceding the meta-model 260. For example, the ML model layer 220 may include a first classification model 250-1, a second classification model 250-2, and so on to nth classification model 250-$n$. Each classification model 250 is configured to receive the object 210 and generate, for the object 210, a classification and uncertainty metric 255, which is provided to the meta-model 260. For example, the first classification model 250-1 generates a classification and uncertainty metric 255-1 for the object 210, the second classification model 250-2 generates a classification and uncertainty metric 255-2 for the object 210, and so on to the nth classification model 250-$n$ generating a classification and uncertainty metric 255-$n$ for the object 210.

Each classification model 250 may be any suitable classification model, such as a GBDT or other decision tree model, a random forest, a neural network, or a BLR model. In some implementations, the classification models 250 may include different types or the same type of classification models, with the classification models 250 trained to potentially provide different outputs from each other depending on the object provided to the ML model 200. For example, the first classification model 250-1 may be a GBDT model and the second classification model 250-2 may be a neural network, or the first and second classification models may be GBDT models having different hyperparameters. In addition, while FIG. 2 depicts each and every classification model 250 generating an uncertainty metric, in some other implementations, an ML model may include a subset of classification models that generate an uncertainty metric and another subset of classification models that do not generate an uncertainty metric. As such, the present disclosure covers any number of classification models being configured to generate an uncertainty metric. The examples provided herein are described regarding a classification model being a GBDT model with each classification model providing an uncertainty metric exclusively for clarity in describing aspects of the present disclosure.

Providing the object 210 to a classification model 250 may be performed in any suitable manner. For example, a classification model 250 may be configured to receive a defined set of object features. As such, providing the object 210 may include providing the object features of the object to the classification model 250. In another example, the classification model 250 may be configured to receive the object in totality (such as an entire dataset, document, or image) as an input, with the entire object being provided to the classification model 250 and the classification model 250 processing the object to obtain the object features to be an input.

In a further example, a classification model 250 may be in a hidden layer with one or more layers of classification models between the hidden layer and the input of the object, and providing an object to such as classification model 250 may include providing one or more outputs from a previous layer's classification model. For example, FIG. 3 shows an example multiple layer ML model 300 for classifying objects, according to some implementations. The ML model 300 may be an example expanded implementation of the ML model 200 in FIG. 2. The ML model 300 includes layers 1 through k (320-1 through 320-$k$, respectively) for integer k greater than 1. Each layer may be an input layer or a hidden layer of the ML model 300. In the example, the layer 1 320-1 includes one or more classification models to generate classifications and uncertainty metrics 355-1. The other layers may be similar, up to layer k 320-$k$ including one or more classification models to generate classifications and uncertainty metrics 355-$k$. The classifications and uncertainty metrics 355-$k$ are provided to the meta-model 360 for generating the classification 370 (such as described herein with reference to the meta-model 260 in FIG. 2). Providing the object 310 to a classification model of layer k may include providing classifications and uncertainty metrics from classification models of layer k-1. As such, classifications and uncertainty metrics from previous layers may cascade through the ML model 300 to influence subsequent layer classification decisions. In addition, providing the object 310 may include providing one or more object features of the object 310 to the classification model of layer k. While the present disclosure covers any number of layers of classification models for the ML model, the examples described herein are with reference to a single layer of classification models for clarity in explaining aspects of the present disclosure.

Referring back to FIG. 2, a layer level classification model 250 is configured to generate a classification F and an uncertainty metric U from an input x. In some implementations, each layer level classification model 250 may be a type of binary classification model (such as a binary GBDT model) that is trained using a unique subset of the training data D used to train the ML model 200. For example, the first layer level classification model 250-1 is trained using a subset $x_1$ of training data D to generate the output $(F_1, U_1)$, the second layer level classification model 250-2 is trained using a subset $x_2$ of training data D to generate the output $(F_2, U_2)$, and so on to the nth layer level classification model 250-$n$ being trained using subset $x_n$ of training data D to generate the output $(F_n, U_n)$.

Regarding the training data D, D may be conceptualized as tabular data of samples and predictors (such as an N×P matrix of rows including samples N and columns including predictors P). Samples N are subsets of objects to be used for training a layer level classification model. Predictors P are features of an object that may be used for prediction by a classification model. For example, D may include a plurality of objects that may be sampled into different subsets N (such as $N_1$, $N_2$, and so on), and each object has features f for which at least a subset of features may be used as inputs to a classification model (such as $f_1$ for a first classification model, $f_2$ for a second classification model, and so on). In this manner, $x_1$ to be provided to the first classification model 250-1 is $(N_1, f_1)$, $x_2$ to be provided to the second classification model 250-2 is $(N_2, f_2)$, and so on to $x_n$ to be provided to the nth classification model 250-$n$ being $(N_n, f_n)$. In this manner, $x = \{x_1, x_2, \ldots, x_n\} = \{(N_1, f_1), (N_2, f_2), \ldots, (N_n, f_n)\}$.

In some implementations, the classification F that is to be generated by a trained layer level classification model is an indication as to whether or not a specific feature (or subset of features) of an object is relevant or not to generating a final classification (such as the feature of subset of features being sufficiently correlated to a final classification). For example, a layer level classification model may be configured and trained to generate a binary classification as to whether a defined feature or features of an object to be classified are to be used in generating a final classification (e.g., a scalar indicating a likelihood of the feature or features to be used by the meta-model 260 in generating the final classification). In generalizing to higher class classification models, a classification model may be configured to generate an indication F into more than two classes (e.g., indicating for each feature whether the feature is correlative to a final classification). As such, the classification F may be a vector for a higher class classification model. The examples herein use binary classification models (with F being a scalar) for clarity in explaining aspects of the present disclosure.

In addition to generating a classification F, a layer level classification model is also configured and trained to generate an uncertainty U associated with the classification F. As such, each classification model provides (F,U) to the meta-model 260. For example, the first classification model 250-1 generates $(F_1, U_1)$ from an input $x_1$, the second classification model 250-2 generates $(F_2, U_2)$ from an input $x_2$, and so on to the nth classification model 250-n generating $(F_n, U_n)$ from an input $x_n$. In this manner, the inputs to the meta-model 260 are the classifications $\{F_1, F_2, \ldots, F_n\}$ and corresponding uncertainties $\{U_1, U_2, \ldots, U_n\}$. To note, the meta-model 260 may also receive one or more features that are highly correlated with a final classification. A feature may be deemed manually as highly correlated by a user or developer through real-world observation of the feature on classifications.

Regarding the measurement of uncertainty metric U (also referred to as uncertainty U) associated with a classification F, uncertainty may be divided into two types of uncertainty, aleatoric (data) uncertainty and epistemic (model or knowledge) uncertainty. Aleatoric uncertainty refers to uncertainty associated with the inherent randomness of data, like noise (which typically cannot be removed). Epistemic uncertainty refers to uncertainty associated with insufficient knowledge about a model (which may potentially be reduced through the collection of more training data to further train the model and thus obtain more knowledge about the model). The total uncertainty is the aleatoric uncertainty plus epistemic uncertainty. The uncertainty metric U generated by a classification model may measure the total uncertainty or the epistemic uncertainty for the classification model. The below examples describe example operations for configuring a classification model to calculate an uncertainty U.

Various approaches may be used to attempt to quantify (or even differentiate between) aleatoric uncertainty and epistemic uncertainty, such as an entropy measurement approach or a relative likelihood measurement approach. In some implementations, the uncertainty metric U is based on the entropy measurement approach. For the entropy measurement approach, the uncertainty metric U for a layer level classification model may be based on the predictive posterior distribution H for the probabilities of any desired classification/output y of a discrete domain $\gamma$ given any object/input x of training dataset D.

In other words, assuming that a classification model is trained based on supervised learning, the training dataset D includes a plurality of pairs of object/input x and desired classification/output y, as depicted in equation (1) below:

$$D = \{x_i, y_i\}_{i=1}^n \tag{1}$$

As depicted, the number of pairs of $\{x_i, y_i\}$ in the training dataset may be any suitable number n for integer n greater than or equal to one. The predictive posterior distribution p (also referred to as a posterior) is a distribution of the probability of output y occurring given input x from the training dataset D (i.e., p(y|x, D)). The entropy across model space H of the predictive posterior distribution p (i.e., H[p(y|x, D)]) may be estimated in terms of the Shannon entropy E, as depicted in equation (2) below:

$$H[p(y|x, D)] = E_{p(y|x, D)}\{-\log_2(p(y|x, D))\} \tag{2}$$

The Shannon entropy $E_{p(y|x, D)}$ is based on equation (3) below:

$$E_{p(y|x, D)}\{-\log_2(p(y|x, D))\} = \Sigma_{y \in \gamma} p(y|x, D) \log_2(p(y|x, D)) \tag{3}$$

A classification model may include various model parameters $\theta \in H$, and the total uncertainty may be calculated as the entropy across the entire model space (thus including all potential model parameters $\theta$) for the classification model. If a classification model has specific parameters $\theta$ fixed, the entropy to be calculated may be the aleatoric uncertainty since the epistemic uncertainty is removed. As such, the aleatoric uncertainty may be calculated using equation (4) below:

$$E_{p(\theta, D)} H[p(y|\theta, x)] = -\int_H p(\theta, D)(\Sigma_{y \in \gamma} p(y|\theta, x) \log_2(p(y|\theta, x))) d\theta \tag{4}$$

Since the total uncertainty U (equation (3) above) is the aleatoric uncertainty (equation (4) above) plus the epistemic uncertainty, the epistemic uncertainty (which is the total uncertainty minus the aleatoric uncertainty) is the difference between equations (3) and (4). If equations (3) and (4) were to be used to calculate the epistemic uncertainty, the difference may be measured in terms of the mutual information between hypotheses and outcomes. However, such calculations may require integrating over the model parameter space H.

To be able to efficiently calculate the epistemic uncertainty, discrete mathematics through the use of ensemble techniques may be used to approximate an uncertainty (such as the total uncertainty and the aleatoric uncertainty and thus the epistemic uncertainty). In particular, because a classification model may include any of a variety of model parameters $\theta$, a posterior probability distribution p for the classification model may be based on an ensemble of posterior probability distributions calculated for different instances of a classification model for different model parameters $\theta$. As such, the posterior probability distribution p of output y given input x (i.e., p(y|x)) may be approximated based on the posterior distribution of $\theta$, such as depicted in equation (5) below:

$$p(y|x) = E_{p(\theta, D)} H[p(y|\theta, x)] \approx \frac{1}{m} \sum_{i=1}^m p(y|\theta_i, x), \text{ with } \theta_i \sim p(\theta, D) \tag{5}$$

The total uncertainty from equation (3) for an input x (denoted as $u_t(x)$) may be approximated based on equation (5), as depicted in equation (6) below:

$$u_t(x) = -\sum_{y \in \gamma} \left(\frac{1}{m} \sum_{i=1}^m p(y|\theta_i, x)\right) \log_2\left(\frac{1}{m} \sum_{i=1}^m p(y|\theta_i, x)\right) \tag{6}$$

In addition, the aleatoric uncertainty from equation (4) for an input x (denoted as $u_a(x)$) may be approximated based on equation (5), as depicted in equation (7) below:

$$u_a(x) = -\frac{1}{m} \sum_{i=1}^m \sum_{y \in \gamma} p(y|\theta_i, x) \log_2(p(y|\theta_i, x)) \tag{7}$$

The epistemic uncertainty may be calculated as the difference between equations (6) and (7), which may be easier to compute than the difference between equations (3) and (4) because of the discrete mathematical operations to be performed instead of an integral.

Equations (6) and (7) for calculating uncertainties is based on an ensemble of model parameters across the entire model space. As such, the uncertainty being estimated through such equations is based on an ensemble of classification model instances of different model parameters. Example ensemble techniques for generating an ensemble based on a single classification model for use in determining an uncertainty for the classification model via equations (6) and (7) are described below. The example ensemble techniques are with reference to a binary GBDT model configured to generate an uncertainty U for clarity in describing aspects of the present disclosure. However, any suitable classification model may be configured to generate an uncertainty U, such as a random forest, a neural network, or a BLR model, which may or may not require ensemble techniques for configuring a classification model to generate an uncertainty metric. In addition, the principles described herein may also be expanded to cover a classification model for higher class classifications (such as into three or more classes).

For a binary GBDT model, an ensemble including a plurality of GBDT model instances is to be generated, with each GBDT model instance having different model parameters than other GBDT model instances in the ensemble. Such model instances are collected during the iterative adjustment of the GBDT model during supervised learning (with the training data including labels indicating the desired output of the GBDT model). To note, gradient boosting iteratively combines models (such as decision trees for a GBDT model) through training to improve the accuracy of the gradient boosted model. In particular, during training, each iteration t of the GBDT model $F^{(t)}(x)$ is updated as depicted in equation (8) below:

$$F^{(t)}(x)=F^{(t-1)}(x)+\epsilon h^{(t)}(x) \quad (8)$$

$F^{(t-1)}(x)$ is the instance of the model in the previous iteration, $\epsilon$ is the learning rate, and h is a weak learner chosen from a family of suitable learning functions H. For example, the weak learner h may be chosen to approximate a negative gradient $-g^{(t)}(x,y)$ to be reduced or minimized, such as depicted in equation (9) below:

$$h^{(t)}=\arg_{h\in H}\min E_D[(-g^{(t)}(x,y)-h(x))^2] \quad (9)$$

The set H of weak learners may consist of shallow decision trees, which partition the feature space into disjoint regions called leaves. The final GBDT model may be a sum of at least a portion of the decision trees in H with the parameters of the full model being denoted as a single variable $\theta$ (as used above). With the GBDT model being a binary classification model in the example and the ensemble to have different GBDT model instances with different $\theta$, generating the ensemble may include iteratively adding one or more of the shallow decision trees in the set H assuming the parameters of such decision trees still comply with $\theta$ being in the posterior distribution. To enable a GBDT model to generate a predictive uncertainty, the Stochastic Gradient Langevin Boosting (SGLB) algorithm may be used. As such, the GBDT model may be configured to use SGLD with gradient boosting to be configured to generate a binary classification and an uncertainty metric corresponding to the binary classification.

In general, the SGLB algorithm combines gradient boosting with stochastic gradient Langevin dynamics (SGLD). In comparing the SGLB algorithm to Stochastic Gradient Boosting (SGB), the SGLB algorithm differs from SGB in two main areas: (1) the SGLB algorithm introduces Gaussian noise into gradients of SGB and (2) the adjustment or update stage of SGB is modified to include a regularization term/hyperparameter (referred to as $\beta$). Regarding the introduction of Gaussian noise v into the gradients (with $$v \sim N\left(0, \frac{2}{\beta \epsilon}I_{|D|}\right),$$

where $I_{51\ D|}$ is an identity matrix) and the inclusion of $\beta$, equation (9) for h may be modified as depicted in equation (10) below:

$$h^{(t)}=\arg_{h\in H}\min E_D[(-g^{(t)}(x,y)-h(x,\phi)+v)^2] \quad (10)$$

The weak learner $h^{(t)}$ is associated with parameters $\phi^{(t)} \in R^d$, $h^{(t)}(x,\phi^{(t)})$ written to reflect such dependence. To note, the decision tree h is a linear function of $\phi$.

With equation (9) updated to equation (10) to include Gaussian noise and the hyperparameter, equation (8) regarding the instances of the GBDT model at various iterations t from total iterations T may be updated to equation (11) below (with $\gamma$ being a regularization parameter):

$$F^{(t)}(x)=(1-\gamma\epsilon)F^{(t-1)}(x)+\epsilon h^{(t)}(x,\phi^{(t)}) \quad (11)$$

Since the number of possible decision trees in H is finite given that the training dataset is finite, the model parameters $\theta^{(t)}$ at each iteration t form a Markov chain that converges to a stationary distribution.

To ensure $\theta$ comes from $p(\theta|D)$, a similar constraint as to $\theta$ is applied to the regularization hyperparameter $\beta$, with $\beta=|D|$ and $$\gamma = \frac{1}{2|D|}.$$

It is assumed in the examples herein that the loss function used for training the GBDT model is the negative log-likelihood. For nomenclature, $p(\theta)=N(0,\Gamma)$ refers to the Gaussian prior distribution (also referred to as prior) on parameters $\theta$. The Gaussian prior in light of hyperparameter $\beta$ is the stationary distribution to which the Markov chain converges, and is proportional to the negative log-likelihood, as depicted in equation (12) below:

$$p_\beta^*(\theta) \propto \exp\left(\log(p(D|\theta)) - \frac{1}{2}\|\Gamma\theta\|_2^2\right) \propto p(D|\theta)p(\theta) \quad (12)$$

Typically, an SGLB based ensemble $\Theta$ generated according to the SGLB algorithm is an ensemble of independent models $\theta^{(m)}$ (for integer m from 1 to M). To apply SGLB for a single classification model instead of separate models, since a GBDT model is a combination of decision trees with parameters $\theta$ generated during training, a virtual ensemble for the GBDT model may be created from the decision trees generated at different iterations t of all iterations T of gradient boosting to generate the final, trained GBDT model. To generate a virtual ensemble $\Theta$, any number of the decision tree models generated with parameters $\theta^{(t)}$ at iteration t (referred to simply as model $\theta^{(t)}$) may be included. For example, each model $\theta^{(t)}$ generated each iteration t from 1 to T may be included in the ensemble $\Theta$ (i.e., $\Theta=\{\theta^{(t)}, 1\leq t\leq T\}$), with the ensemble being the Markov chain that converges to a stationary distribution, which may be viewed as the uncertainty U.

If decision trees for all iterations are included, the number of models in the ensemble may be too large and/or models from successive iterations may have significant correlation to one another (and thus not appear at least close to independent from each other). For example, model $\theta^{(1)}$ may include one decision tree/leaf, model $\theta^{(2)}$ may include two decision trees/leafs (which also includes the first leaf), model $\theta^{(3)}$ may include three decision trees/leafs (which also includes the first leaf and the second leaf), and so on until $\theta^{(T)}$ during T iterations of gradient boosting. To prevent the number of models in the ensemble from being too large (thus requiring significantly increasing processing means and time for a GBDT model) and to reduce correlation between successive models in the ensemble (such as from $\theta^{(1)}$ to $\theta^{(2)}$), in some implementations, generating the ensemble includes adding each kth set of parameters (i.e., every kth model for any suitable integer k) across T to the ensemble for a GBDT model. To note, k may be any suitable integer that may be defined in any suitable manner. In particular, each kth iteration of performing gradient boosting during training to generate the GBDT model, the model $\theta^{(kt)}$ is added to the ensemble $\Theta_{T,k}$ for the GBDT model. As such, the ensemble includes less than T divided by k number of models. Increasing k (and thus increasing the number of models discarded between models to be included in the ensemble) reduces the correlation between successive included models in the SGLB Markov chain without significantly increasing error through reducing the ensemble size. In some implementations, generating the ensemble also includes preventing a first portion of models $\theta^{(t)}$ (such as the first half, i.e., for t<T/2) from being included in the ensemble $\Theta_{T,k}$, with the first model being $\theta^{(t)}$ for t=T/2 (or the next integer value if T is odd). The generated ensemble $\Theta_{T,k}$ is the portion of the GBDT model to be used to generate an uncertainty U (such as a total uncertainty or an epistemic uncertainty) by the GBDT model based on equations (6) and/or (7) above. For example, if uncertainty U is an epistemic uncertainty, a classification probability from each decision tree of the ensemble may be determined and summed together to generate a total uncertainty and an aleatoric uncertainty according to equations (6) and (7) above, which may be used to calculate the epistemic uncertainty as the difference between the two.

Regarding other classification models that may be configured to generate an uncertainty U, a random forest itself already belongs to ensemble models (with the random forest including an ensemble of trees). As such, equations (6) and/or (7) may be used to generate the uncertainty for the ensemble of trees included in the random forest. For a neural network, node dropout may be introduced or Bayesian distributions on network layer weights may be added in order to introduce an uncertainty to be generated by the neural network. For a BLR model, similar means as described with reference to the meta-model below may be used for generating an uncertainty.

Referring back to FIG. 2, in some implementations, the meta-model 260 is a BLR model configured to receive the classifications and uncertainties (F,U) from the layer level classification models 250 to generate a final classification and confidence. The meta-model 260 may also receive one or more features predetermined to be highly correlated to a final classification for an object outside of receiving the outputs of the layer level classification models. The meta-model 260 is thus trained to generate a final classification and confidence based on the classifications and uncertainties from the layer level classification models (and potentially from the highly correlated features of the object).

Regarding data of objects provided to a classification model i for classification, assuming the classification model i receives $N_M$ instances/rows from x of matrix N×P to generate $(F_i, U_i)$ for those $N_M$ instances, each of $F_i$ and $U_i$ from the classification model i is a vector of size $(N_M,1)$. The features $F_i$ generated by the classification models 1 through n may be combined (such as concatenated) to generate a single matrix $X_M$ of size $(N_M,n)$. Similarly, the uncertainties $U_i$ may be combined (such as concatenated) to generate a single matrix $U_M$ of size $(N_M,n)$. Generation of the final classification and confidence by the meta-model 260 based on the inputs $X_M$ and $U_M$ are described in more detail below. For clarity in explaining aspects of the present disclosure with reference to the meta-model, the examples herein regarding the meta-model 260 are with reference to a binary BLR model configured to handle uncertainties in addition to the classifications from the layer level classification models (such as from binary GBDT models trained based on a virtual ensemble to output classifications F and uncertainties U, such as described above). The BLR model may be based on a normal prior distribution N(0,C), with C being a diagonal matrix having diagonal elements of a variance $\sigma^2$, as described below. As noted above, a final classification may be a mean of a posterior distribution, and a confidence in the final classification may be a variance of the posterior distribution. The uncertainties input to the BLR model may be used to generate a confidence by the BLR model in the final classification generated by the BLR model, and thus quantify each classification model's impact on the final classification by the BLR model.

As setup to describing the new BLR model for handling uncertainties, a conventional BLR model may be specifically designed for binary classification based on linear regression. Each output/target $y_i$ of the BLR model for each instance i is independent from other instances and follows a Bernoulli distribution with probability $p_i$, which is defined in equation (13) below:

$$p_i = p(y = 1|\beta, x_i) = \frac{1}{1 + e^{-\beta x_i}} \tag{13}$$

The input x to the BLR model is the classification/prediction generated by a layer level classification model. For the implementations herein, each input instance to the BLR model is independent, and input features are also independent. For example, $F_1$ from a first classification model 250-1 is independent from $F_2$ from a second classification model 250-2. As such, a feature uncertainty may be determined as an average solely for that feature as described below.

In addition, the log odds is linear such that if the uncertainty U regarding input F increases, the model parameter/coefficient $\beta$ of the BLR model is also associated with a higher uncertainty. With the linearity in log odds, log $$\left(\frac{p_i}{1-p_i}\right) = \beta x_i$$

for model parameter $\beta$, the log-likelihood $\log(p(y|\beta))$ is as defined in equation (14) below:

$$\log(p(y|\beta)) = \Sigma_{i=1}\{y_i \log(p_i) + (1-y_i)\log(1-p_i)\} \tag{14}$$

In light of such linearity, the confidence to be generated by a BLR model (which may be referred to as an uncertainty if the BLR model is a layer level classification model) may be regarded as a variance $\sigma^2$, with var(F)∝var(β)=$\sigma^2$. In generating the equation for the variance $\sigma^2$, through BLR, another prior is assigned to the model parameter β, with sampling from the log posterior log(p(β|y)) to be performed. The proportionality of the log posterior log(p(β|y)) to the log likelihood depicted in equation (14) is depicted in equation (15) below:

$$\log(p(\beta|y)) \propto \sum_{i=1}\{y_i\log(p_i) + (1-y_i)\log(1-p_i)\} - \frac{1}{2}(\beta-m_0)^T S_0^{-1}(\beta-m_0) \quad (15)$$

To note, the Gaussian prior on β, p(β)~N($m_0$,$S_0$) for mean $m_0$ and variation $S_0$. For simplicity, a zero mean ($m_0$=0) is used for the Gaussian prior.

Laplace approximation may be used to obtain a closed form posterior. The posterior may thus be approximated as a Gaussian distribution N($\beta_{MAP}$,$S_N^{-1}$), where MAP stands for the maximum posterior. $\beta_{MAP}$ is calculated by maximizing the log posterior distribution in equation (15) above, with the variation $S_N$ as defined in equation (16) below:

$$S_N = -\nabla\nabla\log(p(\beta|y)) = S_0^{-1} 30 \sum_{i=1}^N p_i(1-p_i)x_i x_i^T \quad (16)$$

The prior p(β) is to include information of parameter β already known. Typically, since no knowledge regarding parameter β is received in advance, the prior p(β) would be configured as a normal distribution. However, the meta-model 260 receives uncertainties U associated with the inputs x (i.e., the classifications F) as generated by one or more layer level classification models (such as layer level GBDT models as described above). As such, the prior covariance matrix $S_0$ is to be generated for equation (16).

As noted above, assuming the features/input x are ($x_1$, ..., $x_n$) of size (N,n) for N instances, each input $x_j$=($x_{1j}$, $x_{2j}$, ..., $x_{Nj}$)$^T$ for feature j is the column vector of size (N,1) input to the meta-model 260. Similarly, U is a matrix of size (N,n) for N instances, with U=($U_1$, $U_2$, ..., $U_n$) and $U_i$ (for i from 1 to n) being a column vector of size (N,1) input to the meta-model 260. Regarding the prior covariance matrix $S_0$ in equation (16) above, since each input $x_i$ is to be independent from each other, the prior covariance matrix $S_0$ is to be a diagonal matrix (also referred to as a diagonal) of size (n,n) for the n classification models. Generating the prior covariance matrix $S_0$ includes generating n diagonal elements of the matrix, with each diagonal element being a variance $\sigma^2$. The variance is an average of uncertainty U for each feature j, as computed based on equation (17) below:

$$\sigma_{ii}^2 = \frac{\sum_{i=1}^N U_{ij}}{N} \quad (17)$$

Based on the uncertainties U from the classification models 1 through n, prior β~N(0,$S_0$). As such, the meta-model 260 is a BLR model with a normal prior.

The BLR model may thus generate a confidence based on sampling the posterior N($\beta_{MAP}$,$S_N^{-1}$) given the prior β~N(0,$S_0$) using ensemble techniques. In particular, M number of models β(B=($\beta_1$, $\beta_2$, ..., $\beta_M$)) may be generated by sampling the posterior N($\beta_{MAP}$,$S_N^{-1}$) M times, with B being the ensemble. The BLR model may thus generate the confidence in a final classification based on equations (6) and (7) above (depending on which uncertainty is to be used for the confidence by the meta-model).

If the meta-model 260 also receives highly correlated features (such as the one or more object features 215), the posterior N($\beta_{MAP}$,$S_N^{-1}$) for the concatenated input of the features 215 and the outputs of the classification models 250 depends on a prior β for the concatenated input. As such, the prior β for the concatenated input is to be generated. The prior β for the outputs of the classification models 250 is β~N(0,$S_0$), with the prior β for the features 215 also to be defined. For prior β for the features 215, there is no prior knowledge received regarding features 215. As such, for a prior β for the received highly correlated features, a diagonal covariance matrix may be a standard multivariate normal distribution applied with an identity matrix (ID)(β~N(0, ID)). For nomenclature, $ID_i$ is an identity matrix used for training a classification model i, and $ID_{N_M}$ is an identity matrix used for training the meta-model. As such, $ID_{N_M}$ is not within a union of the IDs used to train the classification models 250. If a classification model i is a BLR model, the ID of the prior β is $ID_i$. If the meta-model 260 is a BLR model, the ID of the prior β is $ID_{N_M}$. ID is used in a general sense in the examples herein to indicate the identity matrix used for the specific model.

The inputs to the meta-model 260, which includes the outputs of the classification models 250 (i.e., (F,U)) and the one or more features 215, may be conceptually concatenated as an input to the meta-model 260. The two parts of the concatenated input have a prior β~N(0,$S_0$) and a prior β~N(0,ID). The prior β for the concatenated input may thus be as depicted in equation (18) below:

$$\beta \sim N\left(\begin{pmatrix}0\\0\end{pmatrix}, \begin{bmatrix}S_0 & 0\\0 & ID\end{bmatrix}\right) \quad (18)$$

With the prior β generated for the concatenated input, the ensemble techniques described above (i.e., sampling the posterior N($\beta_{MAP}$,$S_N^{-1}$)) based on the prior β depicted in equation (18) may be used to generate the ensemble for the meta-model 260, with a confidence generated using equations (6) and (7) above (based on which uncertainty is to be used for the confidence).

With the configuration of the ML model 140 described above being trained (via supervised learning) to generate a final classification and a confidence in the final classification for an object, the trained ML model 140 may be used to classify an object (such as the ML model 200 classifying the object 210 to generate classification 270 (which includes a confidence in the classification, such as a total uncertainty or an epistemic uncertainty). Operation of a system 100 including a trained ML model 140 for classification is described below with reference to FIG. 4.

Figure 4:
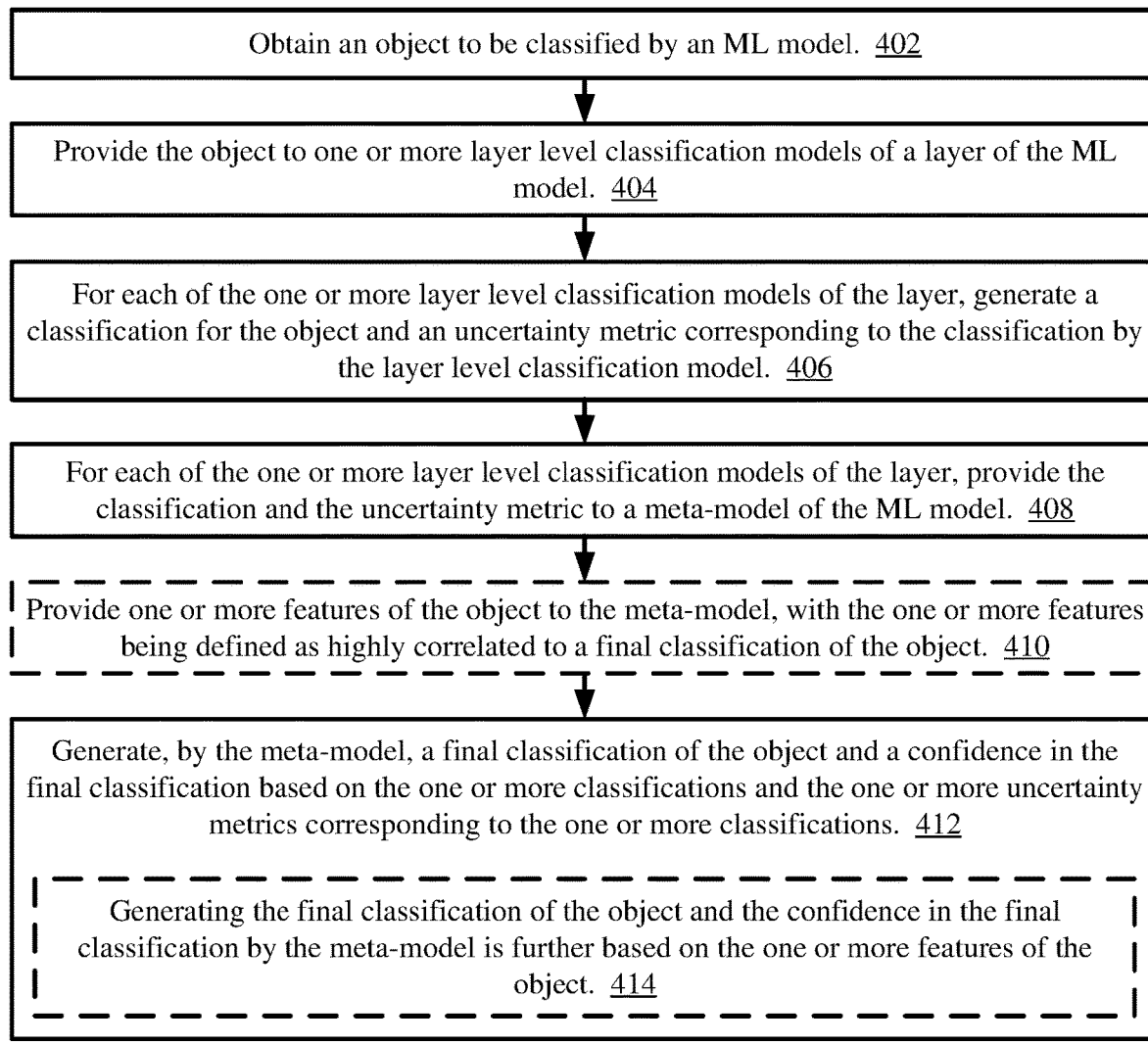
FIG. 4 shows an illustrative flow chart depicting an example operation of classifying an object by a trained ML model, according to some implementations.

FIG. 4 shows an illustrative flow chart depicting an example operation 400 of classifying an object by a trained ML model, according to some implementations. The example operation 400 is described as being performed by the computing system 100 including the ML model 140 for clarity, with the ML model 200 being used as an example implementation of the ML model 140. The ML model 140 in the examples includes n number of classification models 150 and a meta-model 160.

At 402, the system 100 obtains (such as by the interface 110) an object to be classified by the ML model 140. At 404, the system 100 provides the object to one or more layer level classification models 150 of a layer of the ML model 140. For example, the system 100 may provide the specific features of the object 210 to each of the classification models 250 based on the inputs that are defined for each of the classification models 250. In some implementations, each of the one or more layer level classification models 250 of the layer 220 is a binary classification model trained to generate a binary classification and an uncertainty metric corresponding to the binary classification. For example, a layer level classification model 250 of the layer 220 is a gradient boosted decision tree (GBDT) model configured to use stochastic gradient Langevin dynamics (SGLD) with gradient boosting to generate the binary classification and the uncertainty metric corresponding to the binary classification.

At 406, for each of the one or more layer level classification models of the layer, the system 100 (such as the layer level classification model 150) generates a classification for the object and an uncertainty metric corresponding to the classification by the layer level classification model. In some implementations, the classification from a layer level classification model may be whether or not one or more features F of the object correlate to a final classification of the object. For example, a GBDT model may be trained to decide and indicate whether a defined feature F of the object 210 correlates to the final classification of the object 210 to be generated by the meta-model 260. Regarding generation of an uncertainty metric U, the trained layer level classification model (such as a GBDT model) may be configured to use an ensemble based on ensemble techniques described above to generate the uncertainty metric (such as based on equations (6) and (7) above). The uncertainty metric U may be one of a total uncertainty, an aleatoric uncertainty, or an epistemic uncertainty.

At 408, for each of the one or more layer level classification models of the layer, the system 100 (such as the layer level classification model 150) provides the classification and the uncertainty metric to a meta-model 160 of the ML model 140. For example, each layer level classification model 250 may provide an (F,U) for the object 210 to the meta-model 260. In some implementations, the system 100 also provides one or more features of the object to the meta-model, with the one or more features being defined as highly correlated to a final classification of the object (410). As noted above, in some implementations, a feature may be manually defined as highly correlated based on real world observations of a feature and corresponding classifications of objects including such feature.

At 412, the system 100 (such as the meta-model 160) generates a final classification of the object and a confidence in the final classification based on the one or more classifications and the one or more uncertainty metrics corresponding to the one or more classifications. In some implementations, the meta-model is a BLR model trained to generate a posterior probability distribution $N(\beta_{MAP}, S_N^{-1})$ based on the one or more uncertainty metrics corresponding to the one or more classifications. For example, if features 215 are not provided to meta-model 260, a BLR model may use posterior $N(\beta_{MAP}, S_N^{-1})$ based on prior $\beta \sim N(0, S_0)$ for generating the final confidence. As such, generating the confidence in the final classification may include generating a maximum posterior solution for the posterior probability distribution using Laplace approximation, with the confidence in the final classification being based on the variance of the maximum posterior solution. Generating the confidence in the final classification may include calculating the confidence as one of a total uncertainty, an aleatoric uncertainty, or an epistemic uncertainty based on an ensemble, with the ensemble being generated by sampling the posterior probability distribution using ensemble techniques described above.

In some implementations, generating the final classification of the object and the confidence in the final classification by the meta-model is further based on the one or more features of the object (414). For example, if the one or more features 215 that are determined to be highly correlated to the final classification are provided to the meta-model 260, the confidence may be based on sampling a posterior probability distribution $N(\beta_{MAP}, S_N^{-1})$ that is based on a prior $\beta$ generated for the concatenated input to the meta-model 260 of the (F,U)'s from the layer level classification models 250 and the features 215 (such as depicted in equation (18) above).

Through the generation of uncertainty metrics at the layer level classification models 150, a trained ML model 140 is able to generate insights into various classification model 150 impacts on the confidence generated for a classification from the meta-model 160. In some implementations, the system 100 may output the one or more uncertainty metrics to a user. For example, if the ML model 140 includes n number of classification models 150, the ML model 140 may be configured to output the n uncertainty metrics for classification of an object, and the system 100 (such as via the interface 110) may output at least a portion of the n uncertainty metrics for review by a user. For example, all uncertainty metrics may be output on demand or as generated for a user's convenience to review how well the ML model 140 is performing in its classification tasks. In another example, if a final classification of an object is associated with a low confidence (such as a total uncertainty or an epistemic uncertainty calculated at the meta-model 160 being greater than a threshold), the system 100 may be configured to output the uncertainty metrics to a user to give the user insight into why the ML model 140 performed poorly in classifying the object. In addition or to the alternative, the system 100 may be configured to output one or more uncertainty metrics that are greater than a threshold, thus indicating which classification models 150 have a high uncertainty associated with their classifications for an object. With a user having insight into the confidence in the final classifications, a user may be able to manually adjust the ML model 140 (such as by removing or replacing a poor performing classification model 150) to improve the performance of the ML model 140.

In addition or alternative to providing the uncertainty metrics for review by a user, the system 100 may be configured to adjust the ML model 140 to attempt to automatically improve performance. In some implementations, the system 100 may compare the one or more uncertainty metrics. For example, the system 100 may compare the uncertainty metrics over time to one or more thresholds. Such comparison may indicate whether one or more of the classification models 150 are a poor performer (such as a percentage or threshold number of uncertainty metrics from the classification model 150 being greater than a threshold uncertainty). Based on the comparison, the system 100 may adjust the meta-model 160 to compensate for at least one of the one or more uncertainty metrics. For example, the meta-model 160 may be updated to disregard a layer level classification model 150 that consistently has classifications associated with a high uncertainty (such as a number or percentage of uncertainties from the classification model being greater than an uncertainty threshold over an amount of time or for a last number of objects classified by the ML model 140). In this manner, if the ML model 140 includes n number of classification models 150, the meta-model 160 may use only n−1 number of (F,U) from the classification models 150 to generate a final classification and confidence (thus excluding outputs from the classification model 150 associated with a high uncertainty). For example, the meta-model 160 may be retrained, with a posterior probability distribution regenerated and sampled to generate an ensemble with the specific classification model 150 excluded. As such, the system 100 (such as the adjusted meta-model 160) may generate a new final classification of an object and a new confidence in the final classification. In some implementations, the performance of the ML model 140 may be tracked over time to determine whether the excluded classification model 150 is to be reintroduced, such as by reversing the adjustments to the meta-model 160 when disregarding the classification model 150. For example, the final confidences over time after disregarding a classification model may be compared to the final confidences before disregarding the classification model to determine whether the classifications by the ML model 140 have improved (such as the new classifications having an average confidence greater than a threshold more that an average confidence from the old classifications). While some examples of improving the ML model 140 are provided, any suitable means of improving the ML model 140 may be performed based on tracking and comparing the uncertainty metrics from the layer level classification models 150.

As described above, the system 100 may use an ML model 140 to classify objects, with the ML model 140 configured to generate insights into a confidence in its classifications. As such, a user may be made aware of the reasoning behind specific confidences generated by the ML model 140 in its object classifications, which may allow the user to better optimize the ML model 140 for future classifications. In addition, such insights may be used to attempt to automatically improve the ML model 140.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for classifying objects by a machine learning (ML) model, comprising:
   obtaining an object to be classified by the ML model;
   providing the object to a plurality of layer level classification models of a layer of the ML model;

for each of the plurality of layer level classification models of the layer:
generating a classification for the object and an uncertainty metric corresponding to the classification by the layer level classification model; and
providing the classification and the uncertainty metric to a meta-model of the ML model; and
generating, by the meta-model, a final classification of the object and a confidence in the final classification based on the plurality of classifications and the plurality of uncertainty metrics corresponding to the plurality of classifications.

2. The method of claim 1, further comprising providing one or more features of the object to the meta-model, wherein:
the one or more features are defined as being highly correlated to the final classification; and
generating the final classification of the object and the confidence in the final classification by the meta-model is further based on the one or more features of the object.

3. The method of claim 2, wherein each of the plurality of layer level classification models of the layer is a binary classification model trained to generate a binary classification and an uncertainty metric corresponding to the binary classification.

4. The method of claim 3, wherein each of the plurality of layer level classification models of the layer is a gradient boosted decision tree (GBDT) model generated at different iterations of gradient boosting to generate a final, trained GBDT model, wherein each layer level classification model is configured to use stochastic gradient Langevin dynamics (SGLD) with gradient boosting to generate the binary classification and the uncertainty metric corresponding to the binary classification.

5. The method of claim 2, wherein the meta-model is a Bayesian logistic regression (BLR) model trained to generate a posterior probability distribution based on the plurality of uncertainty metrics corresponding to the plurality of classifications and the one or more features of the object provided to the BLR model, wherein the confidence in the final classification is based on the posterior probability distribution.

6. The method of claim 5, wherein generating the confidence in the final classification includes generating a maximum posterior solution for the posterior probability distribution using Laplace approximation, wherein the confidence in the final classification is based on the variance of the maximum posterior solution.

7. The method of claim 6, wherein generating the confidence in the final classification further includes calculating the confidence as one of a total uncertainty, an aleatoric uncertainty, or an epistemic uncertainty based on an ensemble, wherein the ensemble is generated by sampling the posterior probability distribution.

8. The method of claim 1, further comprising outputting the plurality of uncertainty metrics to a user.

9. The method of claim 1, further comprising:
comparing the plurality of uncertainty metrics;
adjusting the meta-model to compensate for at least one of the plurality of uncertainty metrics; and
generating, by the adjusted meta-model, a new final classification of the object and a new confidence in the new final classification.

10. A system for classifying objects by a machine learning (ML) model, the system comprising:

one or more processors; and
a memory storing instructions that, when executed by the one or more processors, causes the system to perform operations comprising:
obtaining an object to be classified by the ML model;
providing the object to a plurality of layer level classification models of a layer of the ML model;
for each of the plurality of layer level classification models of the layer:
generating a classification for the object and an uncertainty metric corresponding to the classification by the layer level classification model; and
providing the classification and the uncertainty metric to a meta-model of the ML model; and
generating, by the meta-model, a final classification of the object and a confidence in the final classification based on the plurality of classifications and the plurality of uncertainty metrics corresponding to the plurality of classifications.

11. The system of claim 10, wherein the operations further comprise providing one or more features of the object to the meta-model, wherein:
the one or more features are defined as being highly correlated to the final classification; and
generating the final classification of the object and the confidence in the final classification by the meta-model is further based on the one or more features of the object.

12. The system of claim 11, wherein each of the plurality of layer level classification models of the layer is a binary classification model trained to generate a binary classification and an uncertainty metric corresponding to the binary classification.

13. The system of claim 12, wherein each of the plurality of layer level classification models of the layer is a gradient boosted decision tree (GBDT) model generated at different iterations of gradient boosting to generate a final, trained GBDT model, wherein each layer level classification model is configured to use stochastic gradient Langevin dynamics (SGLD) with gradient boosting to generate the binary classification and the uncertainty metric corresponding to the binary classification.

14. The system of claim 11, wherein the meta-model is a Bayesian logistic regression (BLR) model trained to generate a posterior probability distribution based on the plurality of uncertainty metrics corresponding to the plurality of classifications and the one or more features of the object provided to the BLR model, wherein the confidence in the final classification is based on the posterior probability distribution.

15. The system of claim 14, wherein generating the confidence in the final classification includes generating a maximum posterior solution for the posterior probability distribution using Laplace approximation, wherein the confidence in the final classification is based on the variance of the maximum posterior solution.

16. The system of claim 15, wherein generating the confidence in the final classification further includes calculating the confidence as one of a total uncertainty, an aleatoric uncertainty, or an epistemic uncertainty based on an ensemble, wherein the ensemble is generated by sampling the posterior probability distribution.

17. The system of claim 10, wherein the operations further comprise outputting the plurality of uncertainty metrics to a user.

18. The system of claim 10, wherein the operations further comprise:
- comparing the plurality of uncertainty metrics;
- adjusting the meta-model to compensate for at least one of the plurality of uncertainty metrics; and
- generating, by the adjusted meta-model, a new final classification of the object and a new confidence in the new final classification.

19. The method of claim 7, further comprising:
- concatenating the plurality of uncertainty metrics and the one or more features to be provided to the BLR model to generate a concatenated input to be provided to the BLR model; and
- generating a prior distribution $\beta$ of the concatenated input as $$N\left(\begin{pmatrix}0\\0\end{pmatrix}, \begin{bmatrix}S_0 & 0\\0 & ID\end{bmatrix}\right),$$

wherein:
- a prior distribution $\beta$ of the plurality of uncertainty metrics is $N(0,S_0)$;
- a prior distribution $\beta$ of the one or more features is $N(0,ID)$; and
- the posterior probability distribution is approximated as $N(\beta_{MAP}, S_N^{-1})$ based on the prior distribution $\beta$ of the concatenated input.

20. The system of claim 16, wherein the operation further comprise:
- concatenating the plurality of uncertainty metrics and the one or more features to be provided to the BLR model to generate a concatenated input to be provided to the BLR model; and
- generating a prior distribution $\beta$ of the concatenated input as $$N\left(\begin{pmatrix}0\\0\end{pmatrix}, \begin{bmatrix}S_0 & 0\\0 & ID\end{bmatrix}\right),$$

wherein:
- a prior distribution $\beta$ of the plurality of uncertainty metrics is $N(0,S_0)$;
- a prior distribution $\beta$ of the one or more features is $N(0,ID)$; and
- the posterior probability distribution is approximated as $N(\beta_{MAP}, S_N^{-1})$ based on the prior distribution $\beta$ of the concatenated input.

\* \* \* \* \*